United States Patent [19]

Wesley

[11] Patent Number: 4,458,672

[45] Date of Patent: Jul. 10, 1984

[54] THERMAL PANEL

[76] Inventor: Richard S. W. Wesley, 1232 Deerpark Dr., #77, Fullerton, Calif. 92631

[21] Appl. No.: 449,446

[22] Filed: Dec. 13, 1982

[51] Int. Cl.³ .............................................. F24J 3/02
[52] U.S. Cl. .................................. 126/440; 126/450; 350/444
[58] Field of Search ............... 126/440, 424, 425, 441, 126/450; 350/444, 448

[56] References Cited

U.S. PATENT DOCUMENTS

| | | | |
|---|---|---|---|
| 1,661,473 | 3/1928 | Goddard et al. | 126/441 |
| 2,520,635 | 8/1950 | Grey | 350/444 |
| 2,888,007 | 5/1959 | Tabor | 126/440 |
| 2,993,409 | 7/1961 | Boyd . | |
| 3,012,477 | 12/1961 | Lodge . | |
| 3,069,753 | 12/1962 | Kirkpatrick . | |
| 3,085,473 | 4/1963 | Bourgeaux et al. . | |
| 3,085,474 | 4/1963 | Bourgeaux et al. . | |
| 3,203,167 | 8/1965 | Green | 126/440 |
| 3,814,504 | 6/1974 | Brady | 350/444 |
| 3,981,293 | 9/1976 | Gillery | 126/441 |
| 3,981,295 | 9/1976 | Minnick | 126/440 |
| 3,991,741 | 11/1976 | Northrup | 126/440 |
| 4,057,048 | 11/1977 | Maine | 350/444 |
| 4,061,420 | 12/1977 | Kaprelian | 350/444 |
| 4,103,673 | 8/1978 | Woodworth | 126/440 |
| 4,137,899 | 2/1979 | Weslow | 126/440 |
| 4,188,941 | 2/1980 | Hopkins | 126/449 |
| 4,217,041 | 8/1980 | Yevick | 350/444 |
| 4,218,889 | 8/1980 | Buell | 126/440 |
| 4,257,401 | 3/1981 | Daniels | 126/440 |
| 4,267,823 | 5/1981 | Bohg et al. | 126/440 |
| 4,287,881 | 9/1981 | Palazzetti | 126/440 |

Primary Examiner—Daniel J. O'Connor
Attorney, Agent, or Firm—William W. Haefliger

[57] ABSTRACT

A thermal panel comprises
(a) a body including a solar radiation transmitting lens sheet, having opposite surfaces characterized in that solar radiation incident on one surface is focussed at one or more narrow zones at the body opposite surface,
(b) a coating on said body opposite surface and defining aperture means in registration with one or more of said narrow zones, whereby solar radiation focussed at said zones may pass through said aperture means, and
(c) said coating having a reflective surface facing away from said body.

18 Claims, 18 Drawing Figures

THERMAL PANEL

BACKGROUND OF THE INVENTION

This invention relates generally to collection of solar radiation, and more particularly concerns a thermal panel and associated apparatus for efficiently retaining heat in response to incidence of solar radiation.

Solar collectors are generally considered as efficient at collecting solar radiation. Unfortunately their ability to collect solar radiation is often almost equalled by their ability to lose this energy, in the form of heat, back into the atmosphere. Such collectors do not satisfactorily minimize the loss of heat from collection systems while at the same time offering little impedance to the flow of solar radiation entering the collectors.

SUMMARY OF THE INVENTION

It is a major object of the invention to provide a solar collector, including a thermal panel, characterized as efficiently collecting solar radiation, and also entrapping same, for energy transfer as desired.

In regard to the above, if a radiating body is placed inside an evacuated container, and the walls of the container are reflective, the loss of heat can be reduced to an absolute minimum. The heat loss will be limited to the small amount of radiation still absorbed by the walls.

Conversely, a lens transmits most of the light energy falling on it, while at the same time concentrating that flow of energy into a smaller area.

Consider a solar collector consisting of an evacuated chamber, with walls which are reflective. The upper wall of the chamber, may for example, include a sheet made of a radiation transmissive material with, the top surface of the sheet covered by an array of lenses. The bottom surface of the sheet is located at the focal plane of these lenses. The collector then is rotated so that the transmissive lenses or panel is facing the sun. Most of the solar energy striking the lenses will pass through the panel, but will be concentrated in the very small area where the sun's image appears on the second surface, i.e. bottom surface of the lens panel. If a reflective coating is located at all those points on the second surface where the sun's image does not appear, the coating will reflect the radiation coming up from below and will entrap the energy within, but will not hamper the sun's rays from passing through.

Basically, then, the invention is embodied in the combination that includes (a) a body including a solar radiation transmitting lens sheet, having opposite surfaces characterized in that solar radiation incident on one surface is focussed at one or more narrow zones at the body opposite surface, (b) a coating on said body opposite surface and defining aperture means in registration with one or more of said narrow zones, whereby solar radiation focussed at said zones may pass through said aperture means, and (c) said coating having a reflective surface facing away from said body.

The sunlight entering the collector is typically made to fall on a device that converts this entrapped radiant energy into a suitable or usable form, such as heat or electricity. The heated medium or product is removable through the walls of the solar collector.

These and other objects and advantages of the invention, as well as the details of an illustrative embodiment, will be more fully understood from the following specification and drawings, in which:

DRAWING DESCRIPTION

FIG. 3b is a top plan view taken on lines 3b—3b of FIG. 3a;

FIG. 3c is a bottom plan view taken on lines 3c—3c of FIG. 3a;

FIG. 4b is a top plan view taken on lines 4b—4b of FIG. 4a;

FIG. 4c is a bottom plan view taken on lines 4c—4c of FIG. 4a;

DETAILED DESCRIPTION

Figure 1:
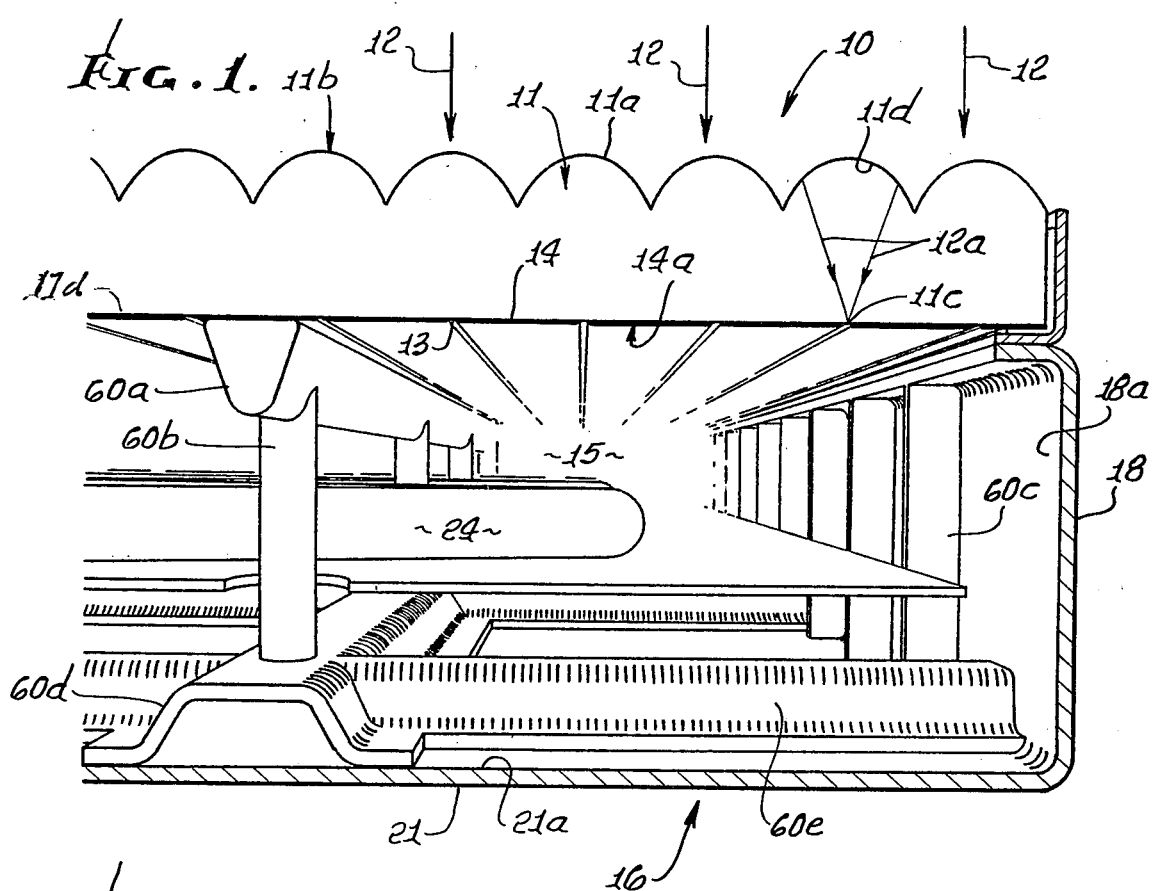
FIG. 1 is a perspective taken in section through one form of apparatus embodying the invention.
Figure 1A:
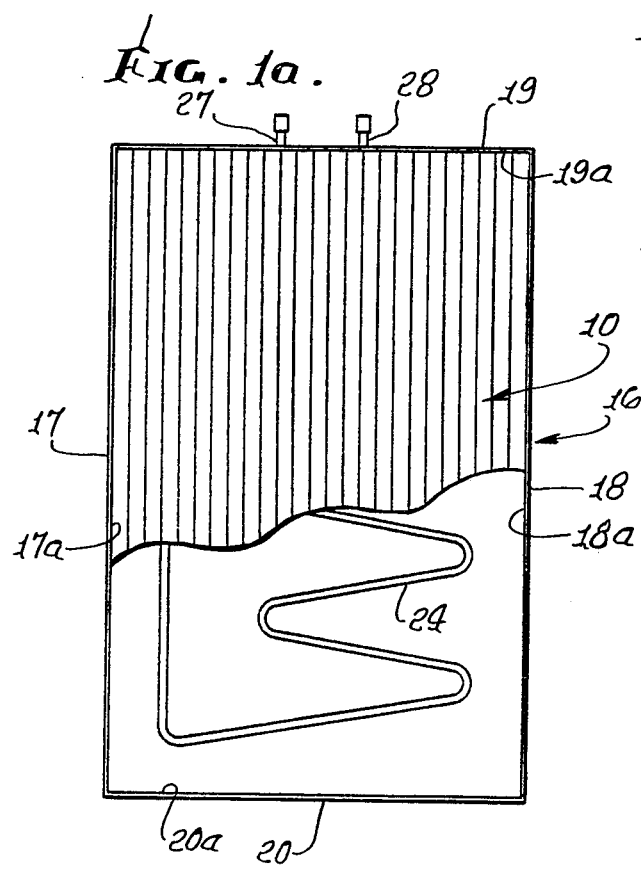
FIGS. 1a and 1b are smaller plan and end views of the FIG. 1 apparatus.
Figure 1B:
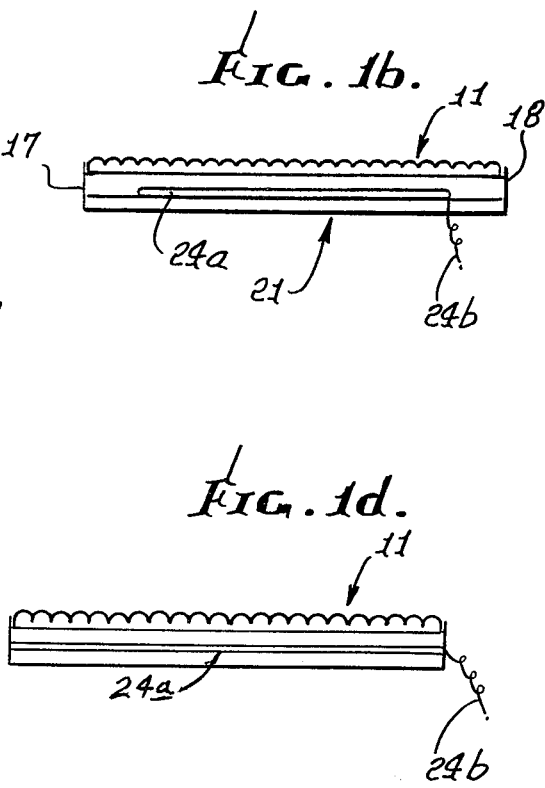
Figure 2:
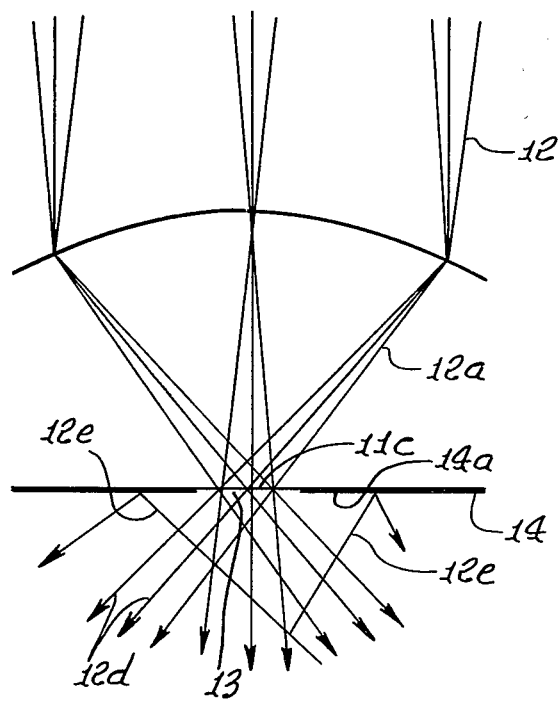
FIG. 2 is a diagrammatic view of solar ray transmission and focussing.

In FIG. 1, body 10 includes a solar radiation transmissive top sheet 11 (glass, plastic, etc.) having a top surface 11a which defines upwardly convex surfaces 11b. The latter define with sheet 11 a multiplicity of lenses. Such lenses focus incident radiation toward narrow zones at or proximate the opposite surface. In FIGS. 1 and 2 see incident radiation 12, convergent at 12a towad zones 11c. The narrow zones may for example be located adjacent and in registration with aperture means such as aperture 13 formed by a thin coating layer or layers 14 on the sheet opposite (lower) surface 11d, so that substantially all of the incident radiation is passed through the narrow zones 11c and apertures 13 to the space 15 at the underside of the body. Coating 14 typically has a reflective surface 14a facing downwardly, i.e. away from the body 10, for radiation entrapment purposes as will appear.

The space 15 may with unusual advantage comprise the evacuated interior of a chamber 16 wherein the entering radiation becomes entrapped. To this end, the chamber 16 may include side walls 17 and 18, end walls 19 and 20 and bottom wall 21, all of which have reflective surfaces 17a–21a facing the enclosed chamber interior or space 15, as shown, whereby radiation is reflected back and forth within that space to heat any object therein. Each of the walls or reflection surfaces 17a–21a and coating 14 may consist of a thin layer of vapor deposited metal such as aluminum or silver, and having a highly reflective surface exposed toward spaced 15.

Also shown in FIG. 1 is a heat exchanger duct 24 extending lengthwise within the space 15, to pass fluid (water, etc) therein for absorbing heat developed as the entrapped solar radiation strikes the duct. The latter consists of metal, as for example copper, aluminum, alloys thereof, etc. The duct extends through one or more walls of the chamber, as at 27 and 28.

Referring to FIG. 2, it shows, diagrammatically, the focussing of incident solar rays 12 and 12a in the lens sheet 11 toward aperture 13 formed by coating 14. Solar rays then pass at 12d into space 15, and are absorbed by the heat exchanger duct 24. Most of the radiant energy transmitted upwardly in the chamber is of long wave length, and is emitted from the heated duct.

Figure 3B:
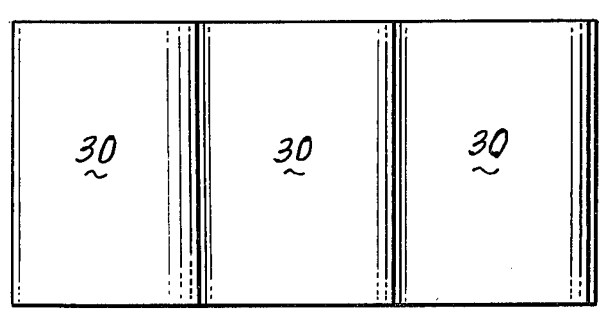
Figure 3A:
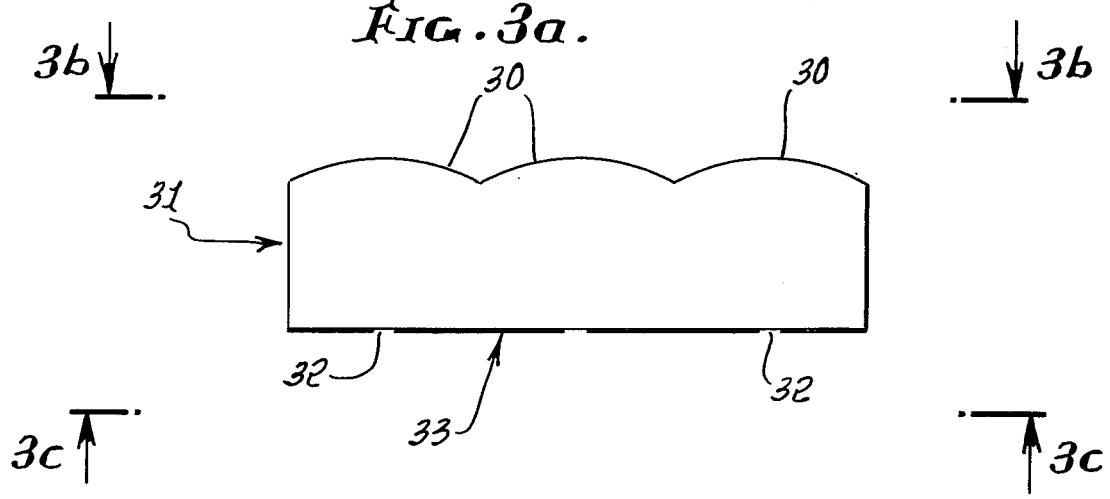
FIG. 3a is a vertical section through a light transmission sheet and reflective coating thereon.
Figure 3C:
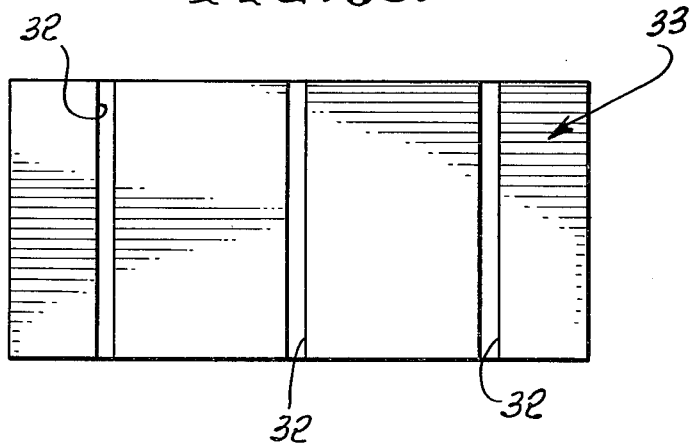

Two basic methods of applying this principal of light energy collection and entrapment will now be described. First, the focusing can take place in one dimension only and the lenses may be essentially linear or rib like, as at 30 in FIGS. 3a and 3b. The sun's image appears as a series of solid ribbons of light running linearly across the bottom surface of panel 31. The apertures 32 (corresponding to apertures 13 in FIG. 1) in reflective coating 33 appear as lines of a width substantially equal to that of the sun's image, or larger, to facilitate tracking the sun. This is one preferred method for solar applications, because accuracy of tracking requirements are relatively lesser in the plane determined by the lens optical axis and the axis of its respective rib. In this regard, the energy falling on the top surface 30 remain a function of the cosine of the angle of incidence, thus tracking in this plane can not be entirely dispensed with. Reflection and absorption losses also increase with an increase in the angle of incidence.

Figure 4B:
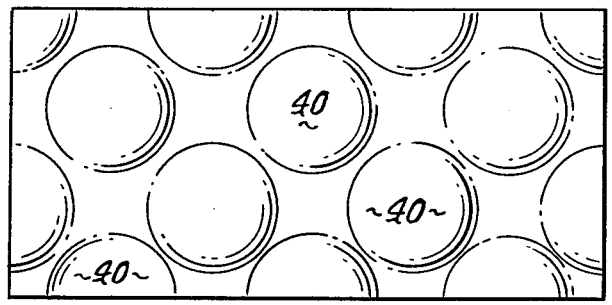
Figure 4A:
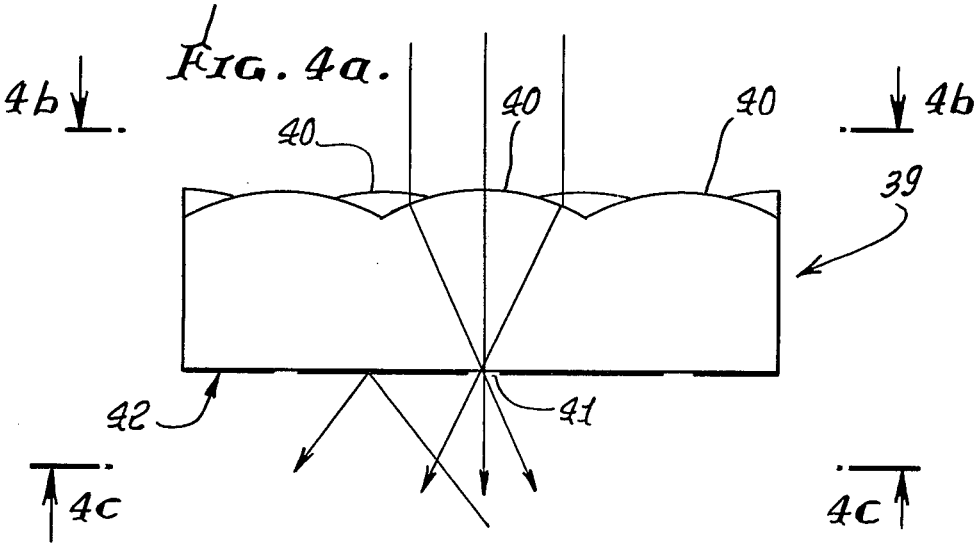
FIG. 4a is a vertical section through a modified transmissive sheet, with reflective coating thereon.
Figure 4C:
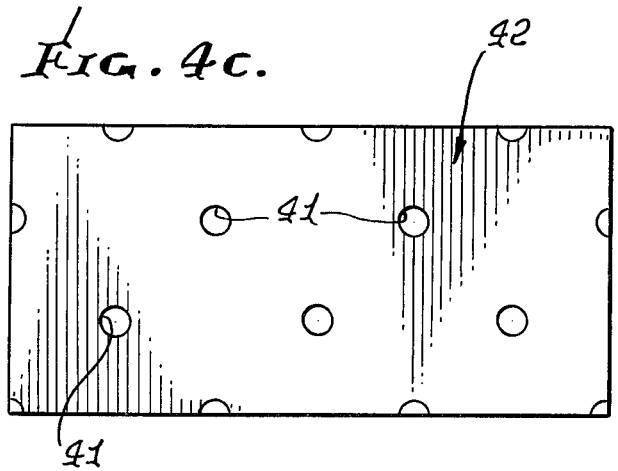

In a second method, focusing takes place in two dimensions, the lenses being circular for example, as at 40 in FIGS. 4a and 4b, the sheet appearing at 39. The sun's image and the clear zones on the panel's reverse side will be an array of circles, as at apertures 41 in coating 42 (see FIG. 4c).

Two lens geometries, the Cartesian oval and the bifocal Fresnel, deserve special consideration for the solar collector described. The Cartesian oval is free of spherical aberation and is capable of forming a perfect image of an isolated point. A lens with large diameter or width with respect to its focal length may be used. The object point would be at infinity and the equation for the Cartesian oval reduces to the equation for a conic surface:

$$z^2 - n^2(x^2 + y^2 + z^2) - 2nf(1-n)z = 0, \quad (1)$$

where x, y, and z are the coordinates of a point on the lens surface, the z axis being coincident with the axis of the lens; n is the index of refraction of the transmissive medium with respect to air; f is the focal distance of the lens. This lens geometry can be used with a system that focuses in one or in both dimensions (see FIG. 5).

The bifocal Fresnel lens maximizes the possible relative width of the lens and, though not completely free of spherical aberation, keeps it to a minimum. The array is similar to a conventional Fresnel lens with prism elements on its upper surface and a plane lower surface. The lens would focus in one dimension only. Rays parallel to the lens axis would be focused onto a straight line. The sun's image as projected by each lens would combine with that of all the other lenses to form a series of ribbons of light. On a conventional Fresnel lens, the surface facing inward on the outer elements of the lens to not contribute to the total illumination of the image; rather, the light falling on those surfaces is scattered to one side and wasted. On the bifocal Fresnel lens, these dead zones are resplaced with active surfaces that focus the rays parallel to the lens axis on to a second straight line (see focal point 50b FIG. 6). Essentially, the outer elements 47 of two Fresnel lenses interlace with each other. On the opposite side of the tangential plane 48 the pattern 49 repeats itself i.e. at 49. The inner surfaces of the outer Fresnel elements would focus rays parallel to the lens axis on to a second and third line 50b and 50c (not shown) at bottom surface 46, and thus would add to the illumination energy from the two adjacent lenses. This sequence would then be repeated throughout the lens array. The bottom surface 46 of the array would again be at the focal plane of the lenses. Those points where the sun's image does not appear would be covered by a reflective coating as at 51. The clear zones or apertures 52 are made equal to, or larger than, the area of the sun's image, so focussed.

Figure 5:
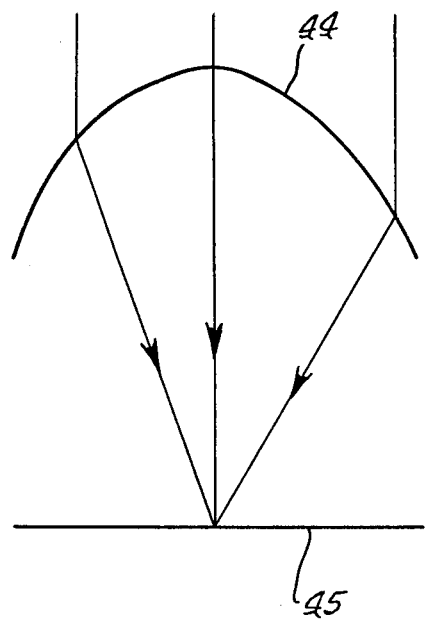
FIG. 5 is a geometric diagram.
Figure 6:
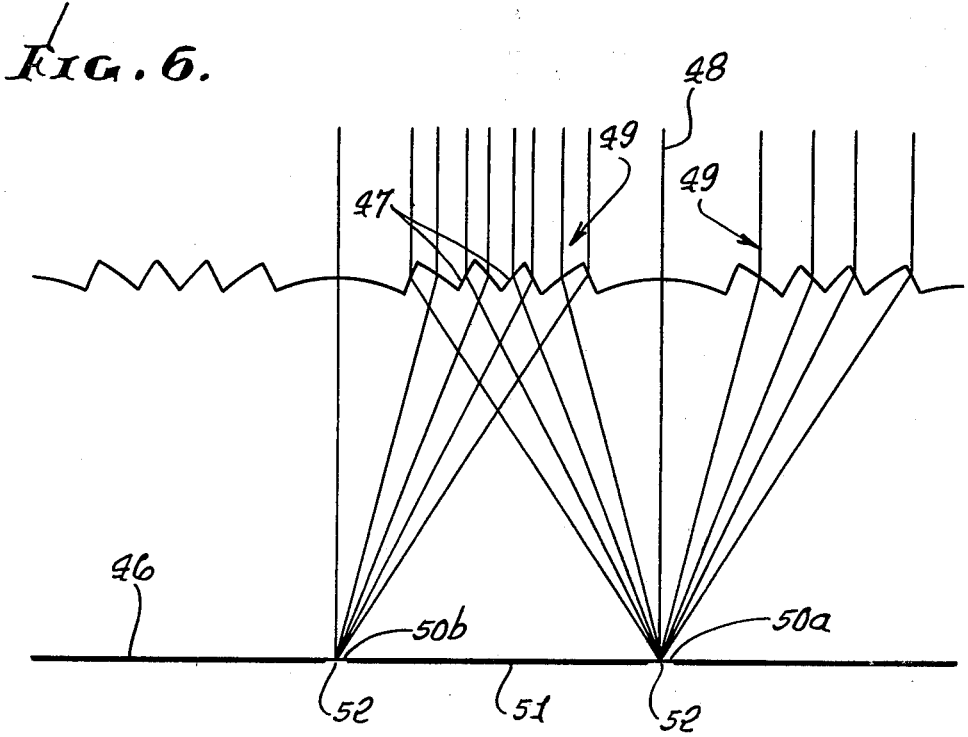
FIG. 6 is a geometric diagram.

A further possible lens has the appearance of the bifocal Fresnel FIG. 6; however, instead of the arc surfaces of the Fresnel, it would have conic or oval surfaces, in particular the curved surface of the Cartesian oval, seen at 44 in FIG. 5, with plane lower surface 46 in FIG. 6. This would make it possible to have step lenses that are completely free of spherical aberation, even when the individual lens elements are rather larger with respect to the focal distance. Application of the lens for the solar collector would be the same as outlined for the bifocal Fresnel.

One of the greater impediments to the flow of solar radiation in to the interior space 15 (in FIG. 1) is due to reflections at the upper and lower surfaces of the transmissive sheet. On conventional optical systems this phenomena can be greatly reduced by the application of films to the glass surface. These films permit a greater overall transmission through the surface because of the intermediate index of refraction of the film and because of constructive interference. This phenomena may be utilized with the solar panel under discussion.

A similar phenomena, destructive interference, may be utilized to reduce the flow of long wave radiation from the system. Consider a single layer or multilayer coating to both increase the radiation entering the system and also reduce the escaping radiation. This becomes possible because of the large difference in the wave lengths of the solar energy entering the collector and that of the heat radiating from it.

The transmissive sheet may be reinforced because of the stresses resulting from the pressure differential across it. The pressure differential is typically due to the inner chamber space 15 being evacuated. For example, the reinforcement may take the form of longitudinal members 60a, directly below and supporting the transmissive sheet, seen for example in FIG. 1. Alternatively, they may be extensions of the sheet. Such longitudinal members may be supported by the sides of the collector or chamber 16 and or by vertical load bearing members 60b. The vertical members may typically be affixed to the energy converter or extend through the converter to the bottom of the collector. The shapes of members 60c, 60d and 60e provide structural reinforcement for the chamber walls and floor.

The load bearing members are typically designed to keep the thermal contact between the energy converter, and the walls of the collector and transmissive sheet to a minimum. This could be achieved by a variety of methods, for example: by having no physical contact between the load bearing members and the energy converter; by having the load bearing members covered by a reflective surface; by designing the geometry of the load bearing member such that the surface of the member exposed to thermal radiation is minimal; by constructing the load bearing members using materials with low thermal conductivity; and by using insulating materials at key points of contact.

A somewhat different technique for countering the stresses and distortions induced by the evacuated chamber is to construct the transmissive sheet with a bowed shape. When the lower surface of the sheet is exposed to vacuum, the atmospheric pressure on the upper surface would force the sheet into the desired planer shape. This technique could be coupled with others, for example, those mentioned above.

Figure 1D:
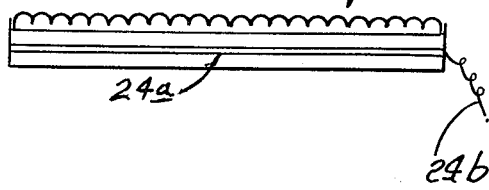
FIG. 1d is a view like FIG. 1b, showing a modification.

Means usable to draw off the energy collected by the solar panel include for example: (1) circulating a liquid or gas in a horizontal coil or plate as at 24 in FIG. 1. The fluid is typically introduced, and removed in heated form, by or through tubing extending through the wall or walls of the collector. (2) Converting the solar energy into electricity with either solar cells or bimetal strips. Device 24a in FIG. 1d may be considered to represent such cells or strips. The produced electric current would be drawn off by suitable wiring 24b. (3) By using the solar energy to drive a chemical reaction. The reactants would be introduced, and the products removed, again by way of tubing, represented at 24 in FIG. 1. Wiring could also be used, as an electric current may be one of the reaction products. Any one, or a combination, of the above, or other means previously used or suggested by other parties, may be employed.

The energy converter may have a black surface or matte when the function of the converter is to heat a liquid or gas. The high absorptivity of the block surface or matte for solar radiation ensures that most of the energy falling on the surface of the converter is absorbed by it. If, as in the case of many black materials, the high absorptivity extends in to the thermal region, then, by Kirchhoff's law, the surface would exhibit an equally high emissive value for this radiation. The energy emitted from the converter surface and that reflected from the surface both contribute to the loss of energy from the system. This loss can be significantly reduced by using a surface that shows high absorptivity for short wave solar radiation and low emissivity for long wave thermal radiation. A number of coatings showing these characteristics are known. Some are multilayered and utilize constructive interference to increase the absorption of solar radiation.

Changing the surface geometry also increases the selectivity. A material with high reflectance becomes a good absorber of short wave solar radiation by the addition of pits or grooves. Such cavities are typically larger than the wave lengths of solar radiation and result in good absorptivity, but are smaller than the wave lengths of thermal radiation, so as not to change the low emissivity of the material for the escaping long wave radiation.

A number of modifications can be made to simplify the proper alignment of the collector to an external solar tracking device of suitable construction. One is the addition of a window on the side or bottom of the collector to permit viewing of a portion of the underside of the transmissive sheet. Because of the symmetry of the lenses and clear zones, establishing that the sun's image is properly centered in one of the zones will assure proper alignment of the collector. A minor refinement is the addition of a mirror or prism at, or below, the underside of the transmissive sheet to permit easier viewing through the side of the collector. This can be improved upon by frosting that portion of the clear zone which is viewed, thereby, making it easier to locate the exact position of the sun's image.

Figure 9A:
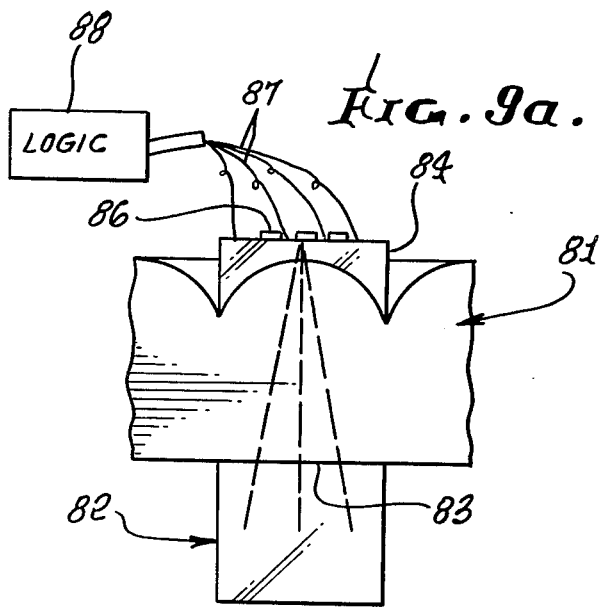
FIGS. 9a and 9b are end and side elevations, in section, showing an optical system to control solar tracking.
Figure 9B:
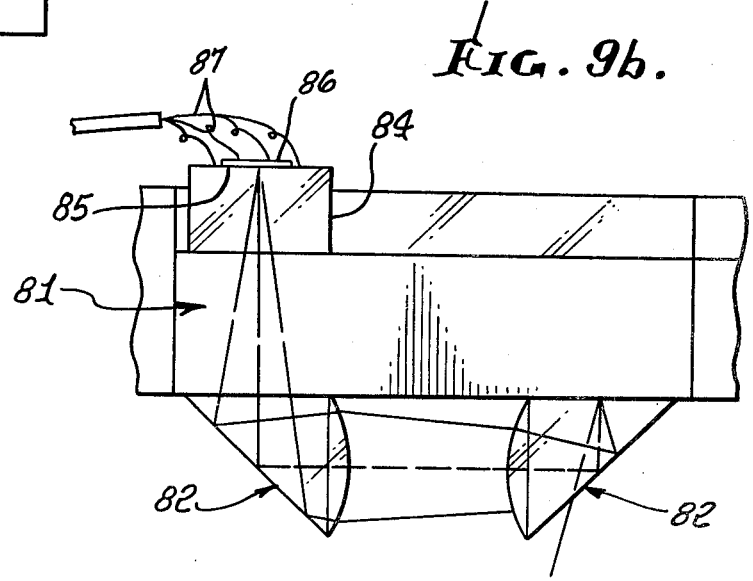

A lens or lenses can be added to the optical system and placed between the prism (mirror) and window (see 82a FIG. 9b). If one surface of the window is the frosted element, then viewing can be improved by having the lens project the sun's image on to that surface; otherwise, the lens can be used simply to magnify the sun's image.

Another refinement is the application of a specially designed mask to the area viewed on the transmissive sheet. See locus of mask 81. For the case where focusing takes place in one dimension only, a usable design for the mask is two narrow clear zones straddling the line of symmetry of the lens rib. The collector will then be properly aligned only when the sun's image illuminates both zones equally. To assist in gross alignment of the collector there would be a third, long, narrow, clear zone. This zone would traverse the line of symmetry. As long as the collector was pointing in the general direction of the sun, the sun's image would appear somewhere in this zone and thereby indicate the correct rotation to restore the sun's image to the center.

Figure 8:
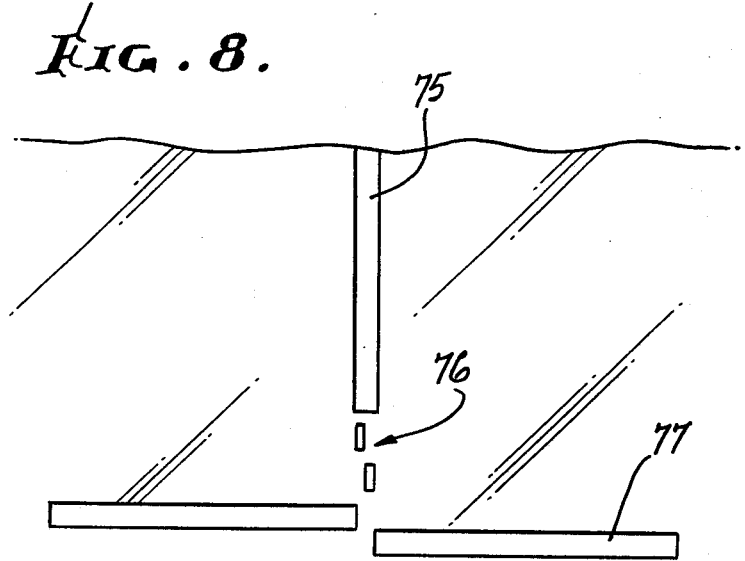
FIG. 8 is a plan view of an optical mask for an automatic tracking device.

In FIG. 9a the addition of light sensors 86, a logic device 88 and a minor modification to the mask makes it possible to design a collector that will control its own solar tracking. In FIGS. 9a and 9b, 81 indicates a mask at focal plane of thermal panel, not shown; 82 indicates prisms each with attached lens; 83 is a clear zone in the reflective coating; 84 is a transparent mounting block with second image focused onto top surface; and 85 is a second mask on top surface aligned to image of first mask (not shown). The long clear zone of the previous mask would be divided into two long clear zones straddling the line of symmetry (77 in FIG. 8). Numeral 75 in FIG. 8 designates a clear zone running along the line of symmetry of the lens rib for passing solar energy into the collector. Numeral 76 indicates short clear zones. The collector is properly aligned only when the sun's image illuminates both zones equally. The light sensors are attached so that if any part of one of the zones becomes illuminated, that information is communicated to the logic device. If the long zone on one side of the symmetry line is illuminated, the tracker rotates in the forward direction at a rapid rate. When the small zone on that side is next illuminated, the tracker would continue rotating in the forward direction but at a reduced rate. When the small zone on the other side becomes equally illuminated the tracker will rotate in the forward direction, but at a rate equal to that of the sun's daily rotation. If the long clear zone on the other side of the line of symmetry had been illuminated first, the collector would have rotated rapidly in the reverse direction. When the small zone on that side first becomes illluminated, the collector will be rotated in the reverse direction at a reduced rate, or have stopped, allowing the sun's rotation to align the collector properly. When both zones are equally illuminated, the collector will again have rotated at a rate equal to that of the sun.

The mask and sensors may be placed on the underside of the transmissive sheet. This is regarded as the preferred location for the mask, as it simplifies alignment of the mask during manufacture. To eliminate components subject to failure from location within the collector, the preferred place for the sensor is on the window looking into the collector. A suitable arrangement would be: mask on bottom surface of transmissive sheet; prism attached to bottom surface at this point; window on wall of collector; lens between window and prism focusing image of mask and sun on outside surface of window; light sensors attached to outside surface of window at appropriate locations.

One variation would be to replace the window with a second prism or mirror. The second prism (mirror) would also be attached to the bottom surface of the transmissive sheet and would project the image of sun and mask on to the top surface of the transmissive sheet, (see 82b, FIGS. 9a and 9b), or on to the top surface of a transparent mounting block 84 affixed to the sheet. To facilitate upward passage of light an opening would exist in the reflective coating, locus 83. Possibly a second mask aligned to the first would appear at the second focal point, locus 85. The light sensors would be attached at the appropriate locations in this area (see FIGS. 9a and 9b).

Figure 1C:
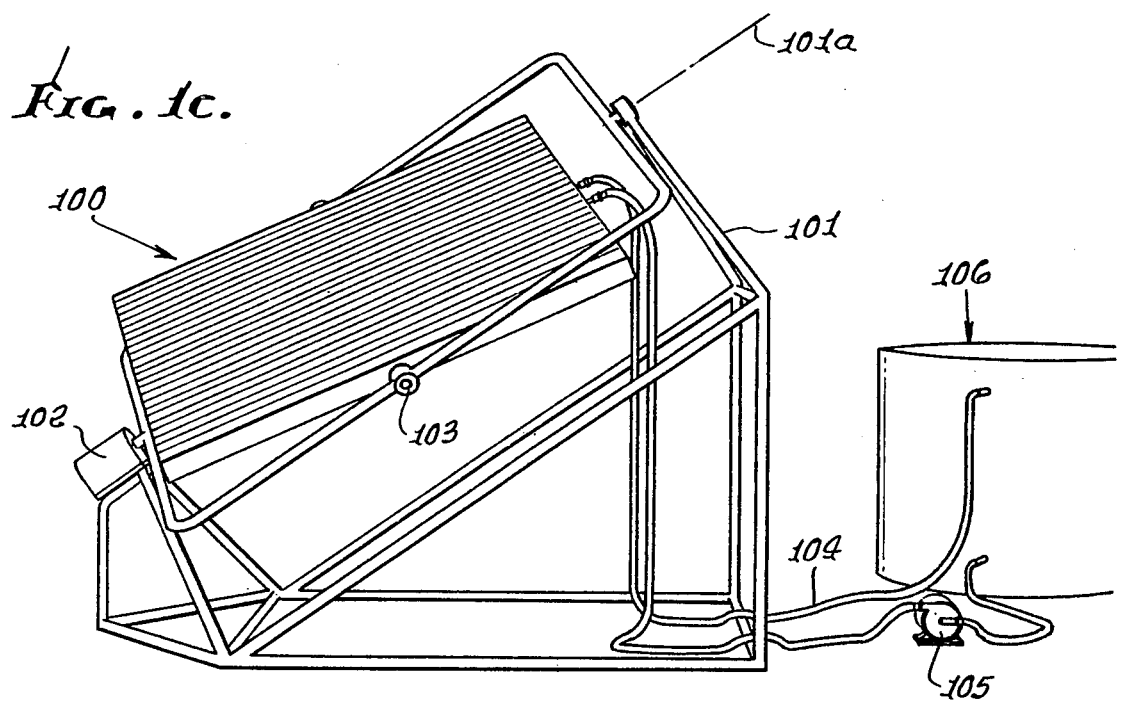
FIG. 1c is an elevation showing support and drive of the FIG. 1 apparatus in solar tracking mode.

FIG. 1c shows the FIG. 1 apparatus at 100, and gimbal mounted as at "equational" mounting 101. Housing 102 encloses a control device and motor that rotates the apparatus 100 about polar axis 101a. Declination mounting and associated axis is shown at 103. The apparatus 100 is connected to hot water tank 106 as by suitable inlet and outlet hoses 104, and pump 105 connected therewith.

Figure 7:
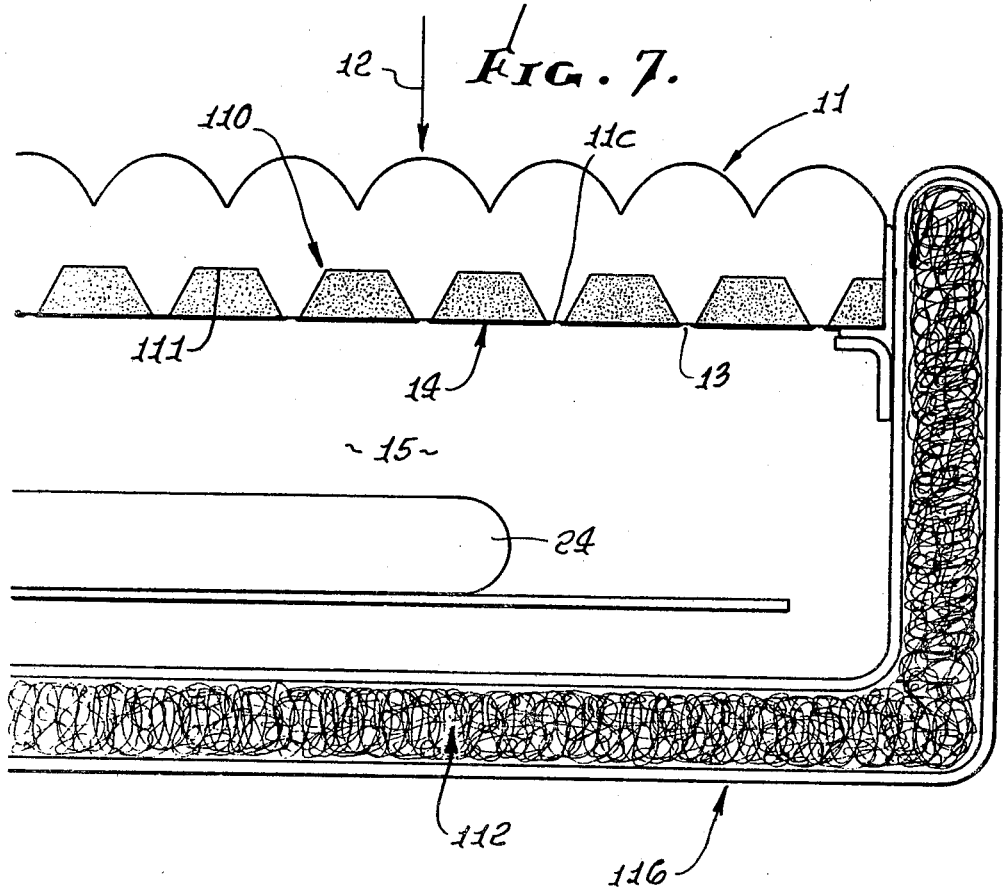
FIG. 7 is an elevation showing a modification.

Finally, the FIG. 7 embodiment shows the inclusion of heat insulation material such as ceramic tile 110 embedded in recesses 111 in the underside of the lens sheet 11, and operating to block heat loss from the space 15 below reflection coating 14. Note that material 110 does not extend over zones 11c or over aperture 13.

Walls and floor of the chamber are insulated at 112, as with glass fiber for example. Chamber interior 15 need not then be evacuated. Since all sides of the chamber 116 are then insulated, evacuation of space 15 may be reduced or dispensed with. The medium filling space 15 can be a gas or gas mixture other than air, for example, pure oxygen with is a much poorer thermal conductor.

I claim:

1. In a solar radiation collecting structure, the combination comprising
   (a) a body including a solar radiation transmitting lens sheet, having opposite surfaces characterized in that solar radiation incident on one surface is focussed at one or more narrow zones at the body opposite surface, said one surface defining a multiplicty of outwardly convex surfaces,
   (b) a coating on said body opposite surface and defining aperture means including multiple apertures in close registration with one or more of said narrow zones, whereby solar radiation focussed at said zones may pass through said aperture means, said coating extending on said lens sheet between said apertures, and
   (c) said coating having a reflective sheet facing away from said body, said coating substantially covering the surface of said lens sheet between said apertures, said lens surface covered by said coating being substantially flat,
   (d) said apertures being spaced apart at said body opposite surface, and including reflective surfaced walls cooperating with said coating reflective surface to define a chamber for receiving and entrapping solar radiation passing through said apertures, there being elongated load bearing structural members associated with said lens sheet and reflective surfaced walls,
   (e) said chamber having an interior at the side of the coating and apertures opposite the lens sheet that is substantially free of a gaseous atmosphere, and including means contained interiorly of said chamber interior to receive incidence of said entrapped solar radiation for development of energy to be removed from the chamber.

2. The structure of claim 1 wherein said apertures include elongated parallel slits which are spaced apart at said body opposite surface.

3. The structure of claim 1 wherein said body includes ceramic insulation means on said lens sheet between said zones, the coating being on said ceramic insulator means.

4. The structure of claim 1 wherein said one surface of the sheet defines a series of parallel, elongated, outwardly convex ribs.

5. The structure of claim 1 wherein said one surface of the sheet defines a multiplicity of spaced, outwardly protruding domes.

6. The structure of claim 5 wherein said apertures define spaced holes respectively underlying said domes.

7. The structure of claim 1 wherein said one surface defines a multiplicity of bifocal Fresnel lens surface configurations.

8. The structure of claim 7 wherein said apertures define spaced holes respectively underlying said configurations.

9. The structure of claim 1 wherein said lens sheet consists of glass.

10. The structure of claim 1 including reinforcement means associated with said lens sheet.

11. The structure of claim 10 wherein said reinforcement means comprises metallic members embedded in the sheet.

12. The structure of claim 1 wherein said structural members include reinforcement means associated with said chamber and transmitting loads acting to urge said lens sheet toward said chamber.

13. The combination of claim 1 wherein said means to receive incidence of entrapped solar radiation comprises one of the following:
    ($x_1$) fluid in a duct
    ($x_2$) solar cell
    ($x_3$) bimetal strip
    ($x_4$) chemical ractor.

14. The combination of claim 1 including means associated with said structure to control movement thereof in tracking relation to the sun.

15. The combination of claim 1 including means associated with said chamber to thermally insulate the interior thereof.

16. The combination of claim 15 wherein said last named means includes tile embedded in said lens sheet.

17. The structure of claim 1 wherein said one surface defines at least one or more Cartesian ovals.

18. In a solar radiation collecting structure, the combination comprising
    (a) a body including a solar radiation transmitting lens sheet, having opposite surfaces characterized in that solar radiation incident on one surface is focussed at one or more narrow zones at the body opposite surface,
    (b) a coating on said body opposite surface and defining aperture means including multiple apertures in close registration with one or more of said narrow zones, whereby solar radiation focussed at said zones may pass through said aperture means, said coating extending on said lens sheet between said apertures, and (c) said coating having a reflective surface facing away from said body, said coating substantially covering the surface of said lens sheet between said apertures, said lens sheet surface being substantially flat, (d) said apertures defining elongated parallel slits which are spaced apart at said body opposite surface, and including reflective surfaced walls cooperating with said coating reflective surface to define a chamber for receiving and entrapping solar radiation passing through said apertures, there being reinforcement means associated with said lens sheet comprising at least one longitudinally elongated upper member extending directly below and in supporting relation with the lens sheet, a load bearing upright support member for said upper member located interiorly of the chamber, an elongated lower support member for said upright member, and multiple side support means at at least one side of the chamber.

* * * * *